US008527887B2

(12) United States Patent
Brown et al.

(10) Patent No.: US 8,527,887 B2
(45) Date of Patent: Sep. 3, 2013

(54) DEVICE AND METHOD FOR IMPROVING EFFICIENCY OF ENTERING A PASSWORD USING A KEY-LIMITED KEYBOARD

(75) Inventors: Michael K. Brown, Kitchen (CA); Neil Adams, Waterloo (CA); George Babu, Kitchener (CA); Herbert Little, Kitchener (CA); Michael S. Brown, Waterloo (CA)

(73) Assignee: Research In Motion Limited, Waterloo (CA)

( * ) Notice: Subject to any disclaimer, the term of this patent is extended or adjusted under 35 U.S.C. 154(b) by 176 days.

(21) Appl. No.: 11/458,466

(22) Filed: Jul. 19, 2006

(65) Prior Publication Data

US 2008/0022226 A1    Jan. 24, 2008

(51) Int. Cl.
*G06F 3/00* (2006.01)

(52) U.S. Cl.
USPC ........... 715/741; 715/825; 713/168; 713/152; 713/183; 713/184; 713/170

(58) Field of Classification Search
USPC .......... 713/168, 152, 183, 184, 170; 715/825
See application file for complete search history.

(56) References Cited

U.S. PATENT DOCUMENTS

| | | | | |
|---|---|---|---|---|
| 5,067,103 | A * | 11/1991 | Lapeyre | 708/146 |
| 6,223,059 | B1 * | 4/2001 | Haestrup | 455/566 |
| 6,636,162 | B1 * | 10/2003 | Kushler et al. | 341/28 |
| 7,117,528 | B1 * | 10/2006 | Hyman et al. | 726/5 |
| 7,178,025 | B2 * | 2/2007 | Scheidt et al. | 713/168 |
| 7,215,258 | B2 * | 5/2007 | Wormald | 341/23 |
| 7,240,192 | B1 * | 7/2007 | Paya et al. | 713/152 |
| 7,373,516 | B2 * | 5/2008 | Ashok et al. | 713/183 |
| 7,403,977 | B2 * | 7/2008 | Kalenius et al. | 709/217 |
| 2002/0196274 | A1 * | 12/2002 | Comfort et al. | 345/741 |
| 2003/0110402 | A1 * | 6/2003 | Park | 713/202 |
| 2004/0095327 | A1 * | 5/2004 | Lo | 345/169 |
| 2004/0108994 | A1 * | 6/2004 | Kato | 345/171 |
| 2004/0142720 | A1 * | 7/2004 | Smethers | 455/550.1 |
| 2004/0178881 | A1 * | 9/2004 | Otsubo et al. | 340/5.54 |
| 2004/0204145 | A1 * | 10/2004 | Nagatomo | 455/566 |
| 2005/0009584 | A1 * | 1/2005 | Park et al. | 455/575.6 |
| 2005/0015524 | A1 * | 1/2005 | Yamada | 710/62 |
| 2005/0044425 | A1 * | 2/2005 | Hypponen | 713/202 |
| 2005/0052558 | A1 * | 3/2005 | Yamazaki et al. | 348/333.12 |
| 2005/0079895 | A1 * | 4/2005 | Kalenius et al. | 455/566 |
| 2005/0184999 | A1 * | 8/2005 | Daioku | 345/589 |
| 2005/0190160 | A1 * | 9/2005 | Wang et al. | 345/168 |

(Continued)

OTHER PUBLICATIONS

Lu et al., Improving the Efficiency and Reliability of Free Energy Perturbation Calculations Using Overlap Sampling Methods; Copy right 2003; http://www.cbe.buffalo.edu/people/pdfPub.jsp?id=1052; 12 pages.*

(Continued)

*Primary Examiner* — Linh K Pham
(74) *Attorney, Agent, or Firm* — Gowling Lafleur Henderson LLP

(57) ABSTRACT

A method is provided for reducing a number of keys that a user is required to depress on a device having a keyboard with a limited number of keys when the user enters a password. The method comprising the following steps. A subset of characters used to define the password is determined. A filter to apply to the keyboard is determined in accordance with the determined subset of characters. The filter is applied when the user depresses the keys. Devices and computer readable medium for implementing the method are also provided.

9 Claims, 4 Drawing Sheets

(56) References Cited

U.S. PATENT DOCUMENTS

| | | | |
|---|---|---|---|
| 2005/0212763 A1* | 9/2005 | Okamura | 345/156 |
| 2005/0235148 A1* | 10/2005 | Scheidt et al. | 713/168 |
| 2006/0007162 A1* | 1/2006 | Kato | 345/168 |
| 2006/0135185 A1* | 6/2006 | Joo | 455/466 |
| 2006/0197685 A1* | 9/2006 | Wormald | 341/22 |
| 2006/0246878 A1* | 11/2006 | Khoury | 455/412.2 |
| 2007/0033647 A1* | 2/2007 | Yang et al. | 726/18 |
| 2007/0281747 A1* | 12/2007 | Pletikosa et al. | 455/564 |
| 2008/0098331 A1* | 4/2008 | Novick et al. | 715/835 |
| 2009/0303187 A1* | 12/2009 | Pallakoff | 345/169 |

OTHER PUBLICATIONS

Search Report issued by the European Patent Office dated Dec. 22, 2006 pertaining to European Patent Application No. EP 06117484.

Office Action issued by the Canadian Intellectual Property Office dated Apr. 23, 2010 for corresponding Canadian Patent Application No. 2,593,887.

Examination Report issued by the European Patent Office dated Mar. 3, 2010 for corresponding European Patent Application No. 06117484.3.

* cited by examiner

DEVICE AND METHOD FOR IMPROVING EFFICIENCY OF ENTERING A PASSWORD USING A KEY-LIMITED KEYBOARD

The present invention relates generally to a device and method for inputting a password and specifically to a device and method for improving the efficiency of doing so when using a key-limited keyboard.

BACKGROUND

Miniaturization within the computing industry has led to the success of portable computers. Laptop, or notebook, computers have become increasingly small in size and lightweight. However, even laptop computers have become too cumbersome for everyday portable computer access. Accordingly, portable digital assistants (PDAs) were introduced. PDAs provide computing functionality in a form factor sufficiently small that it is easy for a user to carry around.

Subsequent advancement of the wireless industry led to PDAs that provide wireless access to the telecommunication infrastructure. Accordingly, many of today's PDAs can facilitate both voice and data communication. The convergence of portable computing devices and telecommunication devices has led to a number of mobile devices that are available to consumers today. Such mobile devices include PDAs, paging devices, smart phones and the like.

However, the drive to portability and a reduced form factor have introduced a number of limitations on the mobile devices. For example, mobile devices generally have limited room for a keyboard in order to provide a minimal size that affords portability.

Ideally, a mobile keyboard equivalent of full keyboard would be implemented on the mobile device. However, in order to achieve such a result, the keys would be too small to be practical. Accordingly, a number of trade-offs have been proposed and implemented by the mobile device industry.

Generally, the solutions assign multiple characters to character keys on a mobile keyboard. Each of the character keys is assigned a principal character, usually an alpha character. Modifier keys are provided so that a user can access other characters assigned to each key. Modifiers include keys such as a shift key, an alt key, a symbol key and the like. Such keyboards are well known in the art and are provided on portable digital assistants (PDAs), such as the BlackBerry® by Research in Motion or the Treo® by Palm, Inc., as well as a host of cellular phones and smart phones.

As a result of the keyboard layout it is often required to press multiple keys to obtain a single character. For example, many PDAs require the depression of a "number lock" modifier key in addition to the character key to represent a number. This can pose a particular annoyance when a user has to enter a password, for example, that is exclusively numeric.

This is particularly true for users who have implemented an additional layer of security. For example, passwords generated by a token, such as the RSA SecurID® token for example, may be required in addition to a PDA password. Such tokens typically generate quasi-random numbers used as an additional layer of security. Similarly, in some instances users may have to gain access to the PDA via a smart card. Accordingly, in addition to the PDA password, a smart card password is required. Frequently, such passwords are numeric. Devices such as tokens and smarts cards are well known in the art and will be referred to generically hereafter as authenticators.

Therefore, it is desirable to provide a method for increasing the ease of entering a string of characters that would normally required the depression of a modifier key in addition to the character key.

BRIEF DESCRIPTION OF THE DRAWINGS

Embodiments will now be described by way of example only with reference to the following drawings in which.

DETAILED DESCRIPTION OF THE PREFERRED EMBODIMENTS

Figure 1:
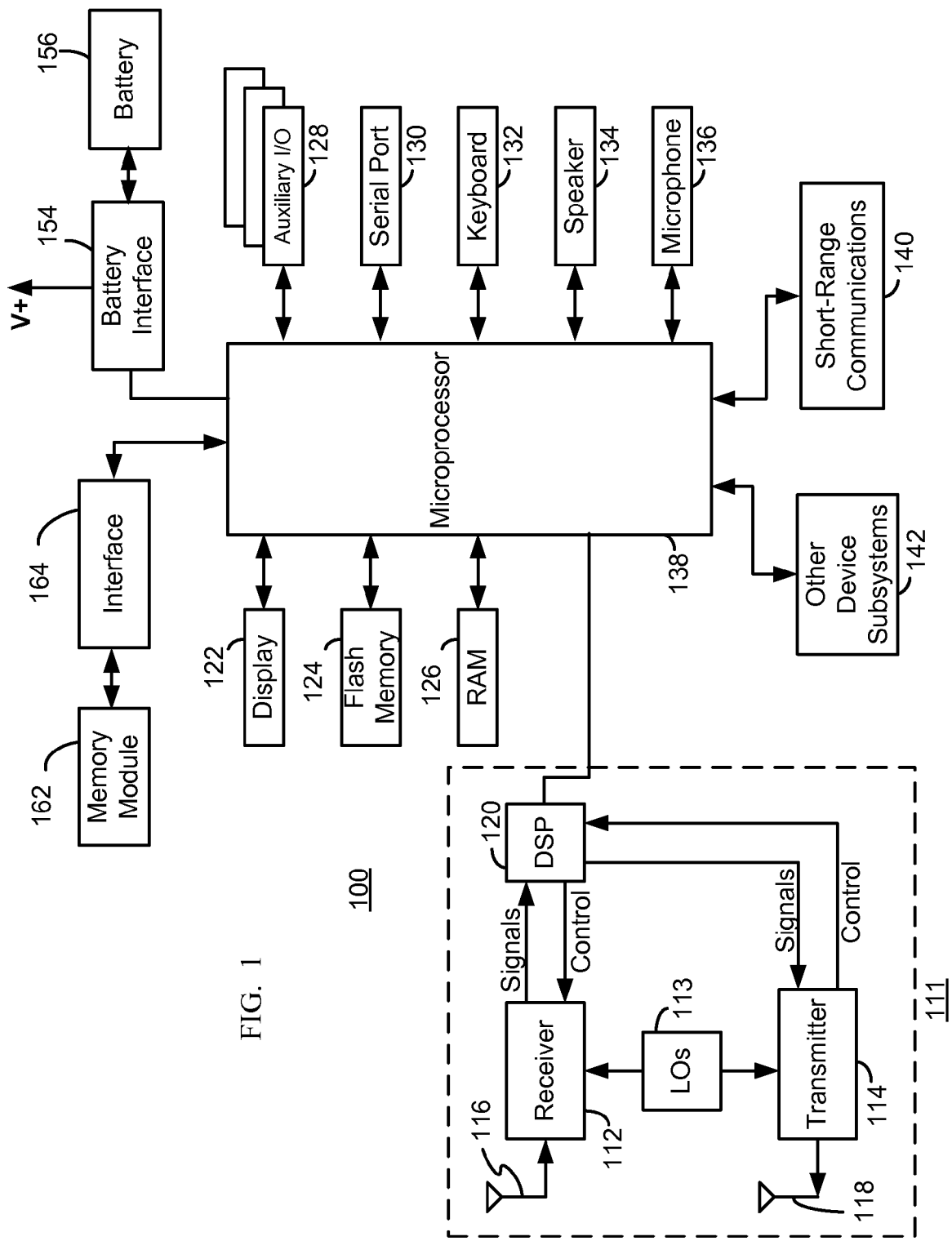
FIG. 1 is a block diagram illustrating a mobile device.

For convenience, like numerals in the description refer to like structures in the drawings. In accordance with one embodiment, there is provided a method for reducing a number of keys that a user is required to depress on a device having a keyboard with a limited number of keys when the user enters a password, the method comprising the steps of: determining a subset of characters used to define the password; determining a filter to apply to the keyboard in accordance with the determined subset; and applying the filter when the user depresses the keys.

In accordance with a further embodiment there is provided a device having a keyboard with a limited number of keys, the device and configured to reduce a number of keys that a user is required to depress when entering a password, the device configured to: determine a subset of characters used to define the password; determine a filter to apply to the keyboard in accordance with determined subset; and apply the filter when the user depresses the keys.

In accordance with yet a further embodiment there is provided a computer readable medium including instructions which, when executed on a device having a keyboard with a limited number of keys, cause the device to implement the following steps when the user enters a password: determine a subset of characters used to define the password; determine a filter to apply to the keyboard in accordance with the determined subset; and apply the filter when the user depresses the keys.

Referring to FIG. 1, a typical mobile device is illustrated generally by numeral 100. The mobile device 100 is often a two-way communication device having both voice and data communication capabilities, including the capability to communicate with other computer systems. Depending on the functionality provided by the device mobile, it may be referred to as a data messaging device, a two-way pager, a cellular telephone with data messaging capabilities, a wireless Internet appliance, or a data communication device such as a PDA (with or without telephony capabilities).

The mobile device 100 includes a communication subsystem 111, which includes a receiver 112, a transmitter 114, and associated components, such as one or more embedded or internal antenna elements 116 and 118, local oscillators (LOs) 113, and a processing module such as a digital signal processor (DSP) 120. As will be apparent to those skilled in field of communications, the particular design of the communication subsystem 111 depends on the communication network in which mobile device 100 is intended to operate.

The mobile device 100 includes a microprocessor 138 which controls general operation of the mobile device 100. The microprocessor 138 also interacts with additional device subsystems such as a display 122, a flash memory 124, a random access memory (RAM) 126, auxiliary input/output (I/O) subsystems 128, a serial port 130, a keyboard 132, a speaker 134, a microphone 136, a short-range communications subsystem 140 such as Bluetooth™ for example, and any other device subsystems or peripheral devices generally designated at 142. Operating system software used by the microprocessor 138 is preferably stored in a persistent store such as the flash memory 124, which may alternatively be a read-only memory (ROM) or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the mobile device 100. A predetermined set of applications, which control basic device operations, is installed on the mobile device 100 during its manufacture. These basic operations typically include data and voice communication applications, for example. Additionally, applications may also be loaded onto the mobile device 100 through a network 104, an auxiliary I/O subsystem 128, serial port 130, short-range communications subsystem 140, or any other suitable subsystem 142, and installed by a user in RAM 126 or preferably a non-volatile store (not shown) for execution by the microprocessor 138. Such flexibility in application installation increases the functionality of the mobile device 100 and may provide enhanced on-device features, communication-related features, or both.

The display 122 is used to visually present an application's graphical user interface (GUI) to the user. The user can manipulate application data by modifying information on the GUI using an input device such as the keyboard 132 for example. Depending on the type of mobile device 100, the user may have access to other types of input devices, such as, for example, a scroll wheel, light pen or touch sensitive screen.

One of the applications running on the mobile device 100 is a smart password application. The smart password application automatically applies an appropriate filter to the keyboard 132 when it is determined that a filter is required. For example, if the smart password application determines that the expected password is numeric, a numeric filter is applied to the keyboard 132. A user will then be able to depress character keys on the keyboard 132 without having to depress a corresponding "number lock" modifier key in order to obtain a numeric character.

Further, in the present embodiment, an icon is presented on the display 122 to indicate to the user that the filter is active. Continuing the previous example of a numeric password, an icon representing "number lock" is presented on the screen so that the user knows that it is not required to depress the "number lock" modifier key in order to obtain a numeric character.

The smart password application can be enabled or disabled by the user, a system administrator or both. If the smart password application is disabled, the mobile device 100 functions without modification. Otherwise, the mobile device 100 functions as described below.

Figure 2:
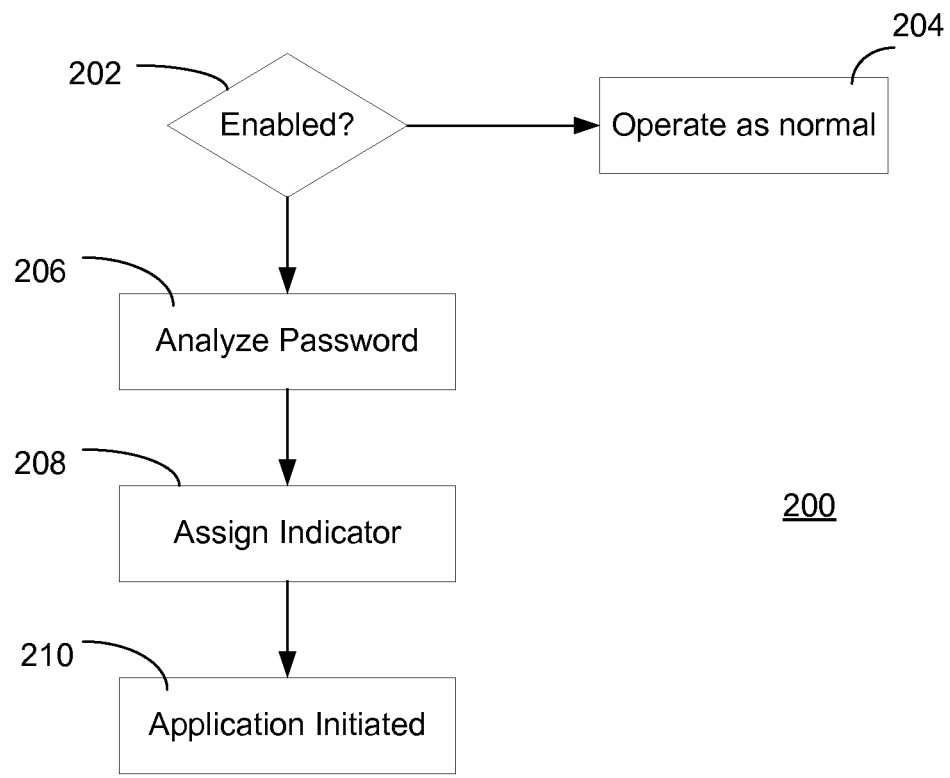
FIG. 2 is a flow diagram illustrating the initiation of a smart password application on the mobile device.

Referring to FIG. 2, a flow chart illustrating the initiation of the smart password application in accordance with the present embodiment is illustrated generally by numeral 200. The smart password application can be enabled as a factory default, an administrator default, or a user setting, as will be appreciated by a person of ordinary skill in the art.

In step 202, the device determined whether or not the smart password application is enabled. If the smart password application is disabled, the operation continues at step 204 and the mobile device 100 operates as is standard in the art. If the smart password application is enabled, the operation continues at step 206.

In step 206, a first time that the user attempts to access the mobile device 100 after the smart password application is enabled, the smart password application analyzes the password(s) entered. In the present embodiment, two passwords are required from the user: a device password and an authenticator password.

For each password entered by the user, the smart password application determines whether or not the characters in the password are entirely part of a subset of the character set that would require the use of a modifier key. That is, whether or not the password includes exclusively numerals, upper case letters or symbols, for example.

In step 208, the smart password application assigns an indicator, or flag, to each password to represent its analysis. Thus, if the password includes only numerals, a flag is set accordingly. Similarly, if the password includes only letters or characters, the flag is set accordingly. Yet further, if the password includes characters from more than one of the subsets, the flag is set accordingly.

In step 210, the smart password application has been initiated and is ready to be implemented on subsequent login attempts by the user.

Figure 3:
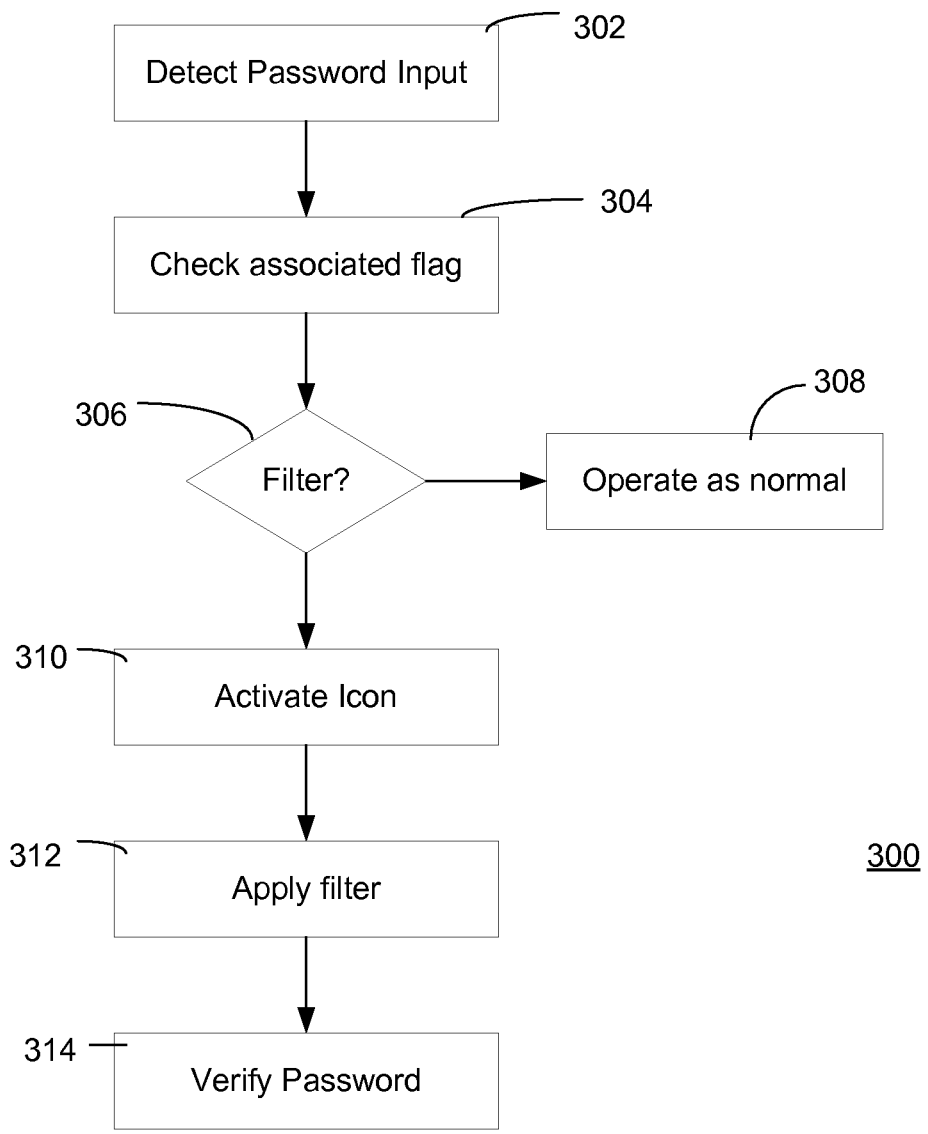
FIG. 3 is a flow diagram illustrating the operation of the smart password application on the mobile device.

Referring to FIG. 3, operation of the smart password application once it has been initiated is illustrated generally by numeral 300. In step 302, the smart password application detects that the user is entering data into a password field. In step 304, the smart password application checks the flag associated with the password.

In step 306, the smart password application determines whether or not to apply a filter in accordance with the associated flag. If a filter is not to be applied, that is the password includes characters across different character subsets, the operation continues at step 308 and the password is entered as is standard in the art. If a filter is to be applied, the operation continues at step 310.

In step 310, an icon is activated on the display 122 to indicate to the user that a filter is active. In the present embodiment, the icon corresponds to the active filter as identified by the flag. For example, if the flag indicates that the password is numeric, the icon indicates to the user that a numeric filter is being applied.

In step 312, the filter is applied to the data input in the password field. Similarly to the previous step, the type of filter to apply is determined by the flag associated with the password. Thus, for example, if the flag indicates that the password is numeric a numeric filter is applied. Accordingly, whether or not the user depresses the modifier key associated with the filter, the filter is applied.

In step 314, the device verifies the password entered by the user as is standard in the art.

Accordingly, it will be appreciated by a person of ordinary skill in the art that the present embodiment provides a user with a more efficient way to enter passwords onto a device when the password comprises a subset of the character set.

Figure 4:
FIG. 4 is a screen shot of a password entry screen on the device.

Referring to FIG. 4, a screen shot of the mobile device 100 is illustrated generally by numeral 400. The screen shot 400 illustrates a login screen for the mobile device 100. In the present example, the login screen includes a first password field 402 for a device password and a second password field 404 for an authenticator password. In the present example, the smart password application is disabled or has not yet been initiated.

Figure 5:
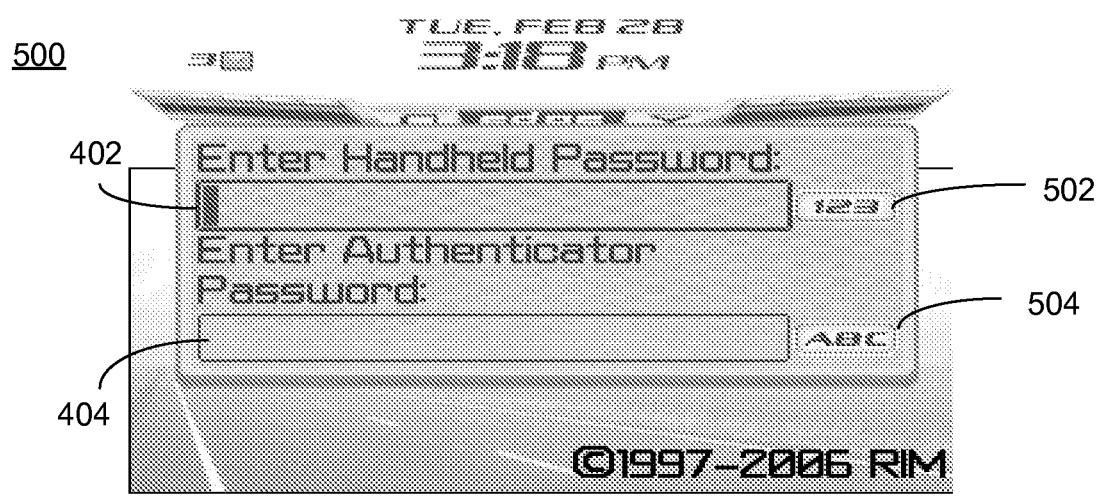
FIG. 5 is an alternate screen shot of a password entry screen on the device.

Referring to FIG. 5, another screen shot of the mobile device 100 is illustrated generally by numeral 500. The screen shot 500 illustrates a login screen for the mobile device 100. In the present example, the smart password application is enabled and initiated. In the present example, the first password is determined to comprise only numeral and the second password is determined to comprise only upper case letters. Accordingly, a numeric filter is applied to the first password field 402 and a numeric icon 502 is displayed to the user. Additionally, an upper case filter is applied to the second password filed 404 and an upper case letter icon 504 is displayed to the user. If either one of the passwords includes a mix of characters from different subsets, then no filter is applied to the corresponding password field. In that case either no icon, or an icon indicating regular text entry is displayed.

In accordance with yet a further feature of the present embodiment, the user has the option to disable the filter when entering the password. If the user notices that a numeric filter is applied, as identified by the numeric icon 502, the user can disable or change the filter by depressing a predefined key. For example, in the present embodiment, if the user depresses an enter key when the password field is empty, the filter toggles between on and off. Optionally, depressing the enter key may cause the filter to toggle between all available filters, as well as no filter. It will be appreciated by a person of ordinary skill in the art that the selection of the key as well as its effect can be implemented using a variety of combinations.

In the embodiment described above, the smart password application is initiated upon a first use by the user as described with reference to FIG. 2. In an alternate embodiment it is not required to initiate the smart password application. Rather, in the present embodiment the smart password application has a priori knowledge of the password. That is, when the device is 102 is configured for the password, it is known at that time what form the password will take. Therefore, the flag for the password can be set without requiring the smart password application to analyze the password. When the user first attempts to login to the mobile device 100, the user will be presented with a filter icon if a filter is applied, as described with reference to FIG. 3.

Further, in the previous embodiments, the keyboard described uses a modifier key in addition to a character key to provide the user with access to a broader set of characters. However, other types of reduced keyboards are widely uses in devices such as cellular telephones and smart phones. Example of such keyboards include multi-tap configurations.

In a multi-tap configuration, each key is assigned a plurality of characters. A user selects one of the assigned characters by repeatedly pressing the same key to cycle through the characters available for that key until the desired character is obtained. Typically, the user has to pause between characters to allow the mobile device 100 to recognize that the character has been selected. Numerous variations of the multi-tap configuration exist and are comprehended by the present embodiment. These variations may also include predictive text entry software such that use for SureType®, provided by Research in Motion.

In accordance with an alternate embodiment, the smart password application is configured to operate for a multi-tap keyboard. In this configuration, the smart password application recognizes a password that is comprised of characters that are represented as the first character on a key. Therefore, when the smart password application is activated, the first character can be committed as soon as it is pressed, rather than forcing the device into multi-tap mode.

Further, it will be appreciated that the filter is not necessarily limited to the first character on the key. Accordingly, in an alternate configuration, the smart password application recognizes a password that is comprised of characters that are represented as the nth character on a key. Therefore, when the smart password application is activated, the nth character can be committed as soon as it is pressed, rather than forcing the device into multi-tap mode.

Although preferred embodiments have been described herein, it will be understood by those skilled in the art that variations may be made thereto without departing from the spirit or scope of the invention as defined by the appended claims.

The invention claimed is:

1. A method for reducing a number of keys received for entry of password on a keyboard of a mobile communication device, the method comprising:
   determining a form of the password, the form indicating that the password is comprised of only numeric characters, only symbol characters or only uppercase characters, the respective numeric, symbol and uppercase characters being accessible by activation of at least one modifier key in addition to at least one key representing a principal character on the keyboard
   assigning a flag indicative of the form of the password;
   determining one of a numeric, a symbol and an uppercase filter to apply to the keyboard in accordance with the assigned flag;
   if a filter is to be applied, displaying, on a display screen of the device, an icon indicative of the determined filter; and
   applying the filter to the keyboard during activation of the at least one key to automatically obtain the respective numeric, symbol and uppercase characters during entry of the password.

2. The method of claim 1, wherein the form of the password is determined by analyzing a first successful password entry by the user.

3. The method of claim 1, wherein the form of the password is determined when the device is configured for the password.

4. A communication device having a keyboard, the communication device comprising a persistent store for storing computer executable instructions for reducing a number of keys received for entry of a password via the keyboard, the instructions operable to:
   determine a form of the password, the form indicating that the password is comprised of only numeric characters, only symbol characters or only uppercase characters, the respective numeric, symbol and uppercase characters being accessible by activation of at least one modifier key in addition to at least one key representing a principal character on the keyboard;
   assign a flag indicative of the form of the password;
   determine one of a numeric, a symbol and an uppercase filter to apply to the keyboard in accordance with the assigned flag;
   if a filter is to be applied, display, on a display screen of the device, an icon indicative of the determined filter; and
   apply the filter to the keyboard during activation of the at least one key to automatically obtain the respective numeric, symbol and uppercase characters during entry of the password.

5. The device of claim 4, wherein the form of the password is determined by analyzing a first successful password entry by the user.

6. The device of claim 4, wherein the form of the password is determined when the device is configured for the password.

7. A tangible non-transitory computer readable medium including instructions which, for execution on a device having a keyboard comprising at least one key representing a principal character as well as one or more other characters of a character subset, the one or more other characters accessible by activating a modifier key in addition to the at least one key representing the principal character, the instructions operable to:

determine a form of the password, the form indicating that the password is comprised of only numeric characters, only symbol characters or only uppercase characters, the respective numeric, symbol and uppercase characters being accessible by activation of at least one modifier key in addition to at least one key representing a principal character on the keyboard;

assign a flag indicative of the form of the password;

determine one of a numeric, a symbol and an uppercase filter to apply to the keyboard in accordance with the assigned flag;

if a filter to he applied, display, on a display screen of the device, an icon indicative of the determined filter; and apply the filter to the keyboard during activation of the at least one key to automatically obtain the respective numeric, symbol and uppercase characters during entry of the password.

8. The tangible non-transitory computer readable medium of claim 7, wherein the form of the password is determined by analyzing a first successful password entry by the user.

9. The tangible non-transitory computer readable medium of claim 7, wherein the form of the password is determined when the device is configured for the password.

\* \* \* \* \*